March 18, 1930.    R. N. HEALD ET AL    1,751,202
GRINDING MACHINE
Filed Jan. 24, 1925    11 Sheets-Sheet 1

Inventors:
Roger N. Heald
Waldo J. Guild
Alfred P. Burnes
George E. Garno
By attorney
Geo. W. Kennedy Jr.

Inventors:
Roger N. Heald
Waldo J. Guild
Alfred P. Burros
George E. Garno
By attorney
Geo. H. Kennedy Jr.

March 18, 1930.     R. N. HEALD ET AL     1,751,202
GRINDING MACHINE
Filed Jan. 24, 1925     11 Sheets-Sheet 3

Inventors:
Roger N. Heald
Waldo J. Guild
Alfred P. Burns
George E. Garno
By Attorney
Geo. A. Kennedy Jr.

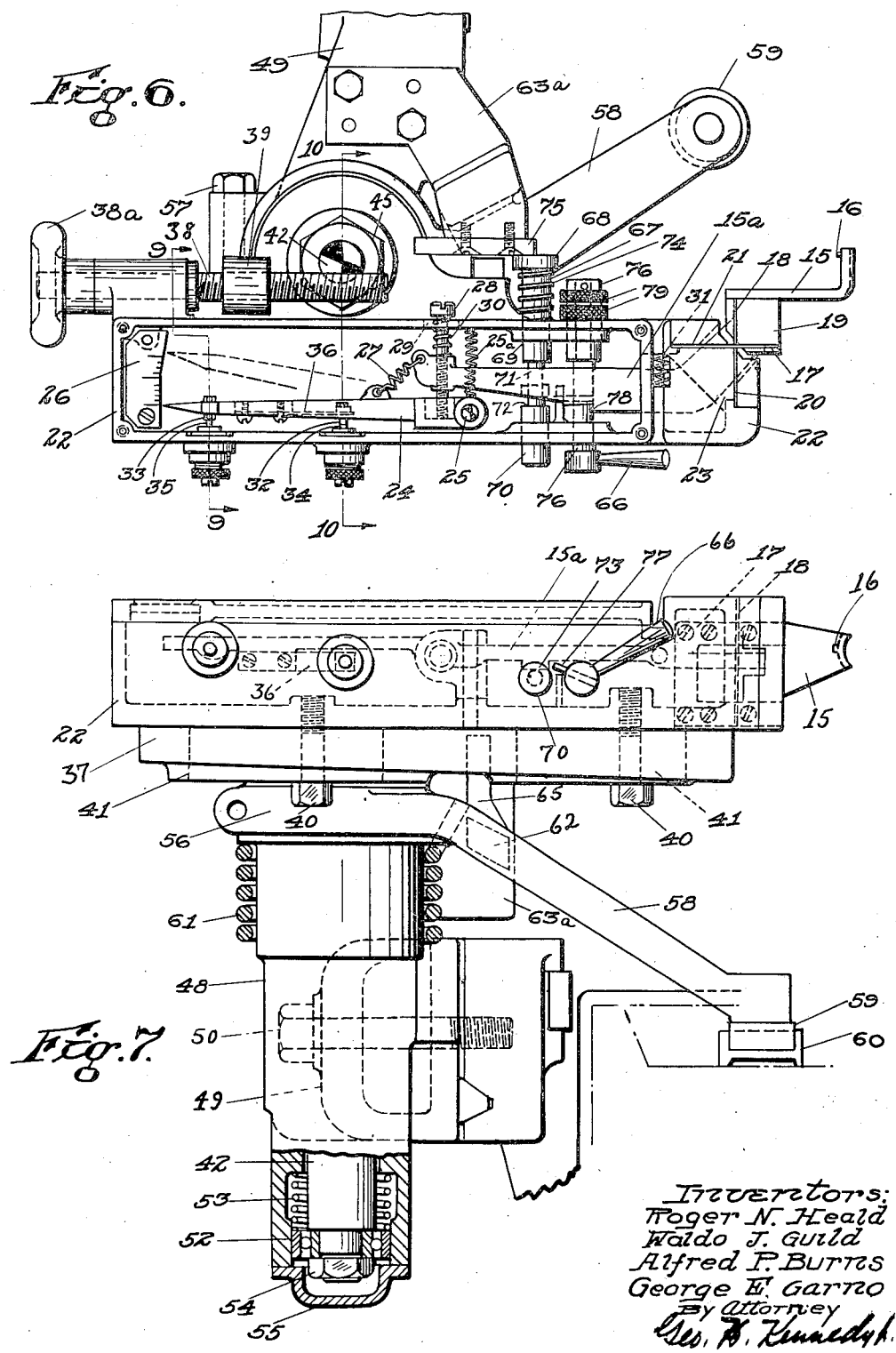

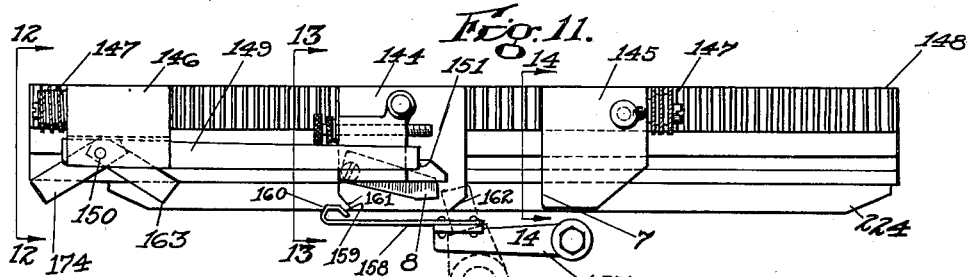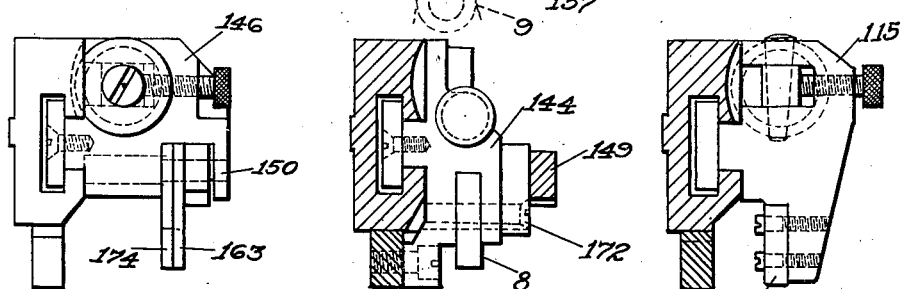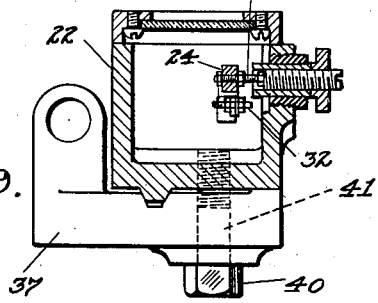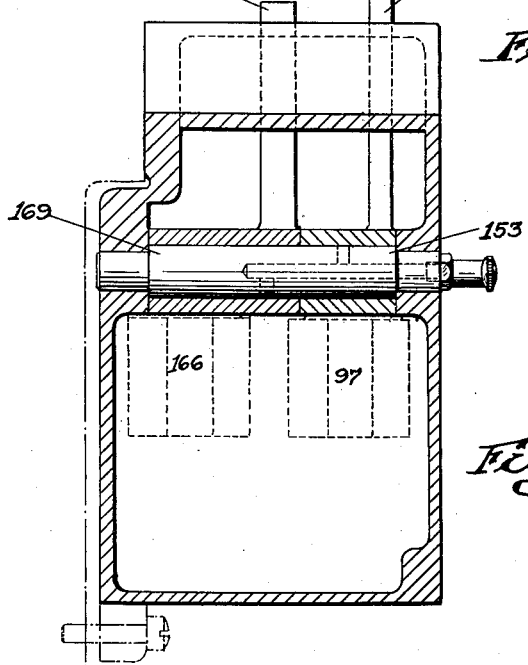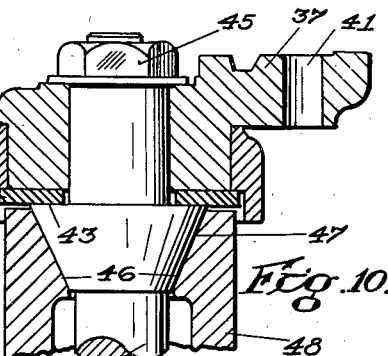

Inventors:
Roger N. Heald
Waldo J. Guild
Alfred P. Burns
George E. Garno
By attorney March 18, 1930.  R. N. HEALD ET AL  1,751,202
GRINDING MACHINE
Filed Jan. 24, 1925  11 Sheets-Sheet 8
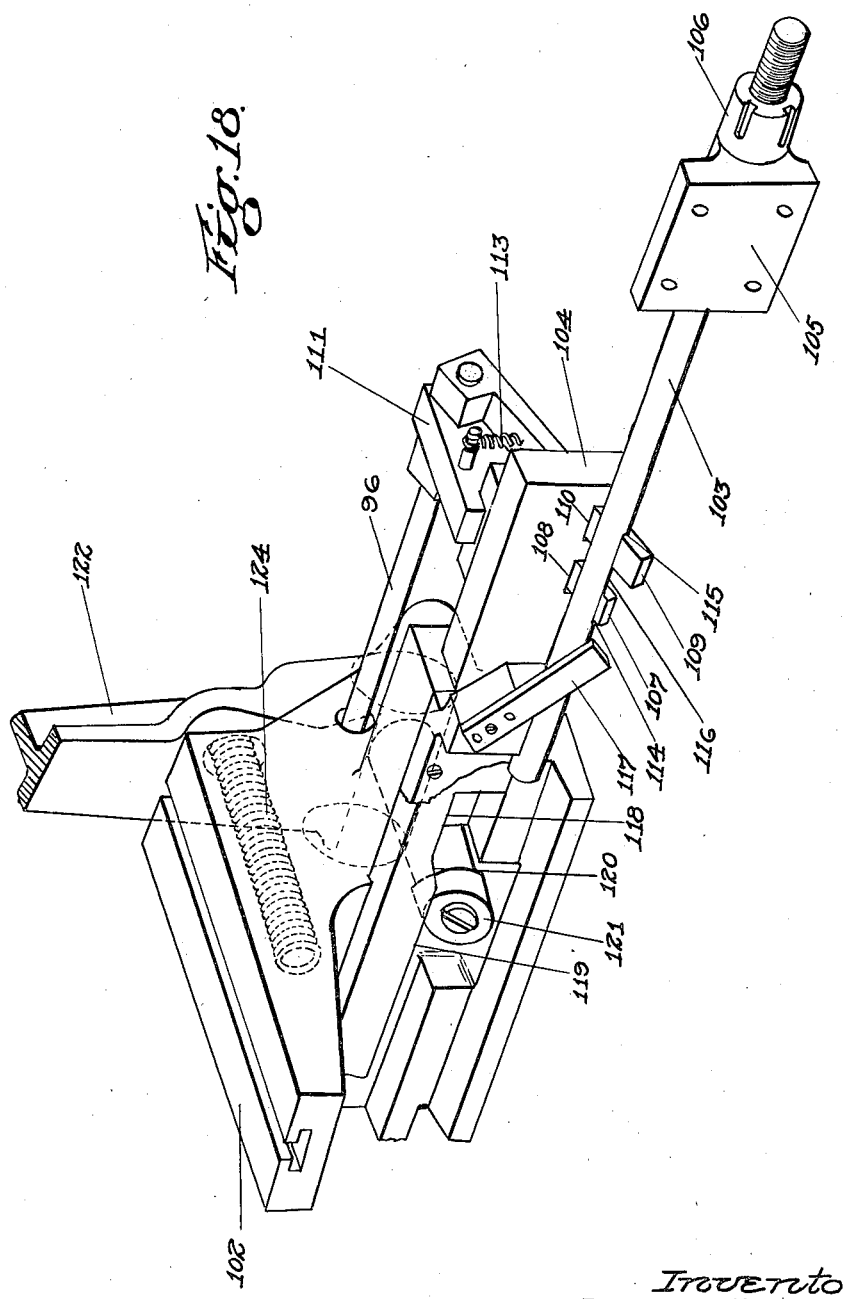
Inventors:
Roger N. Heald
Waldo J. Guild
Alfred P. Burres
George E. Garno
By attorney
Geo. R. Kennedy Jr.

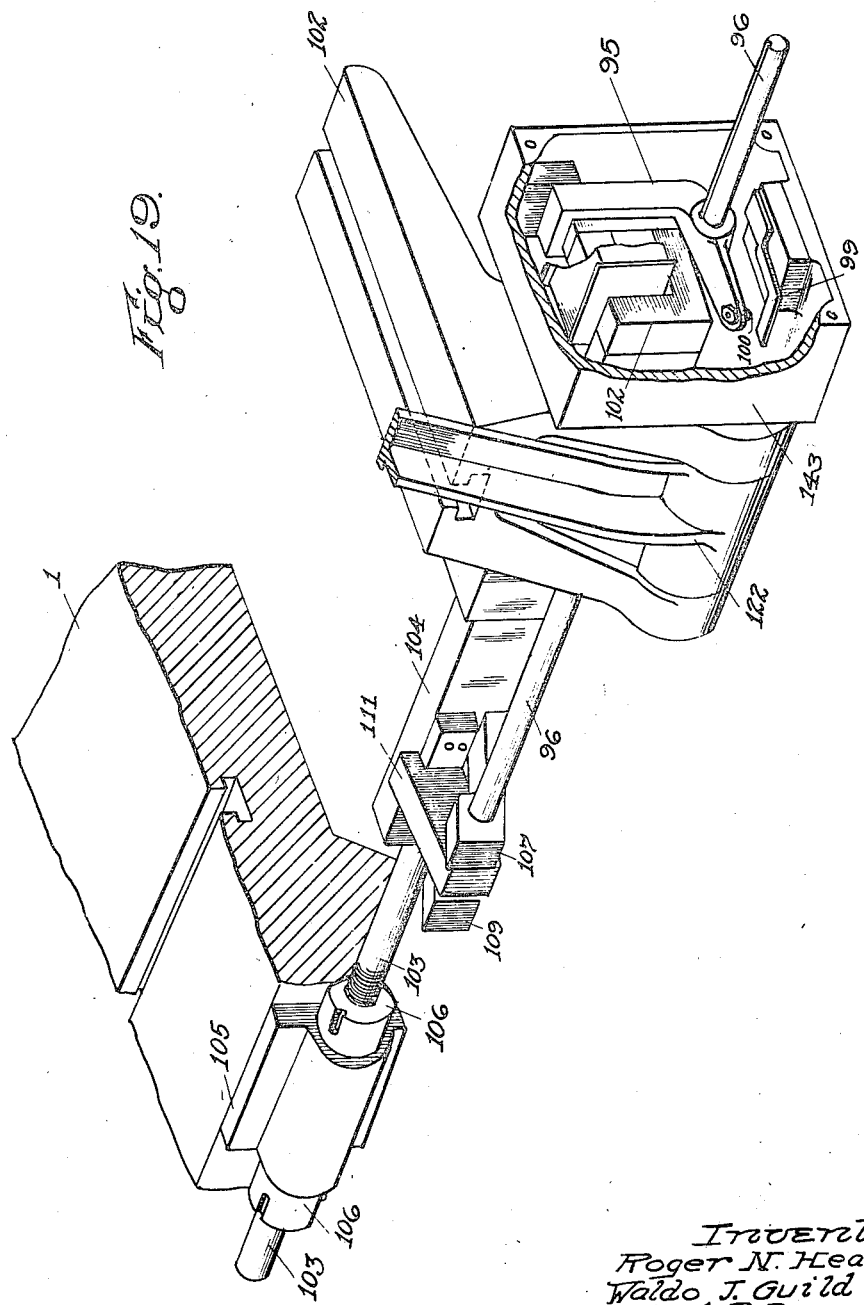

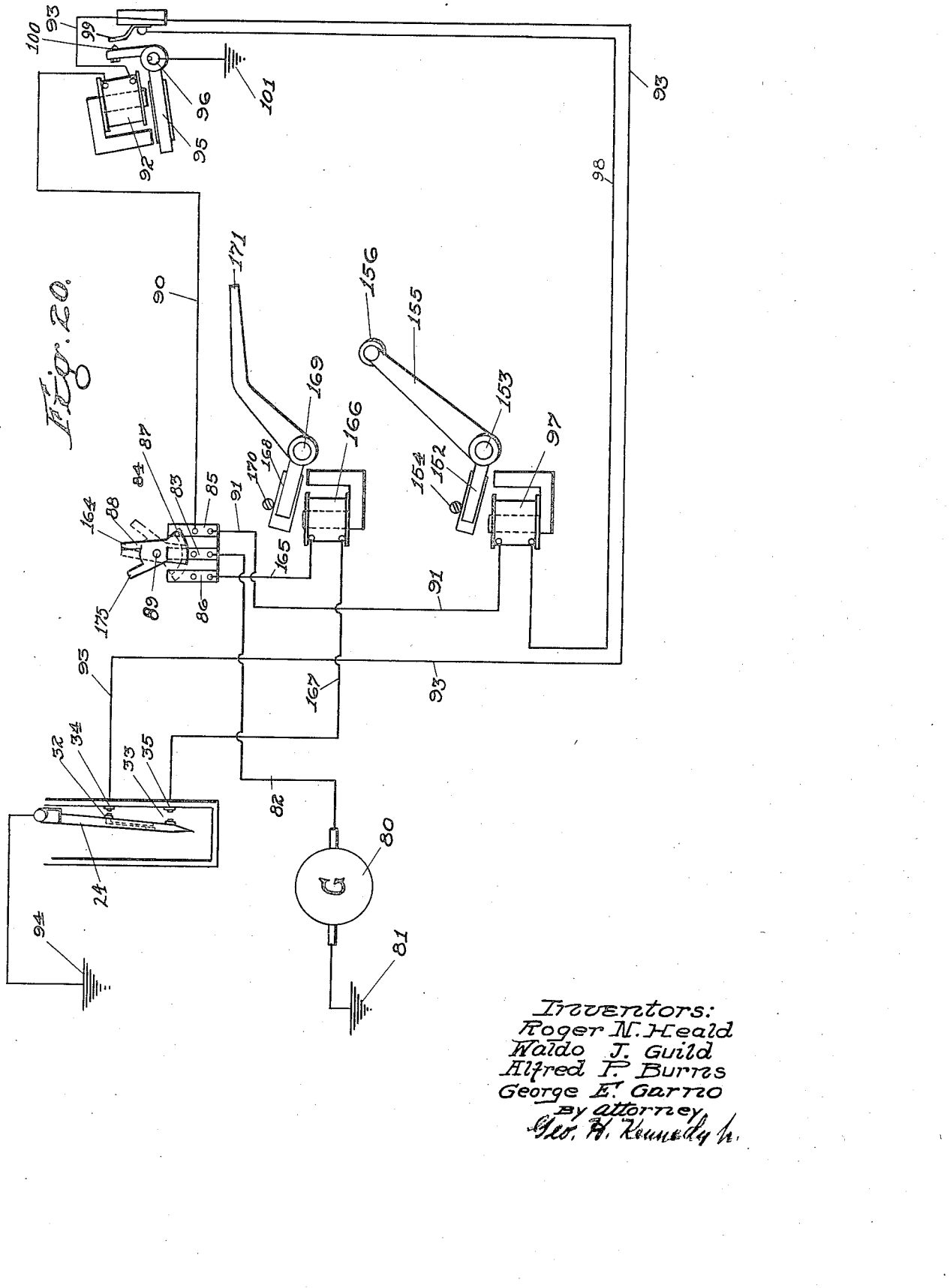

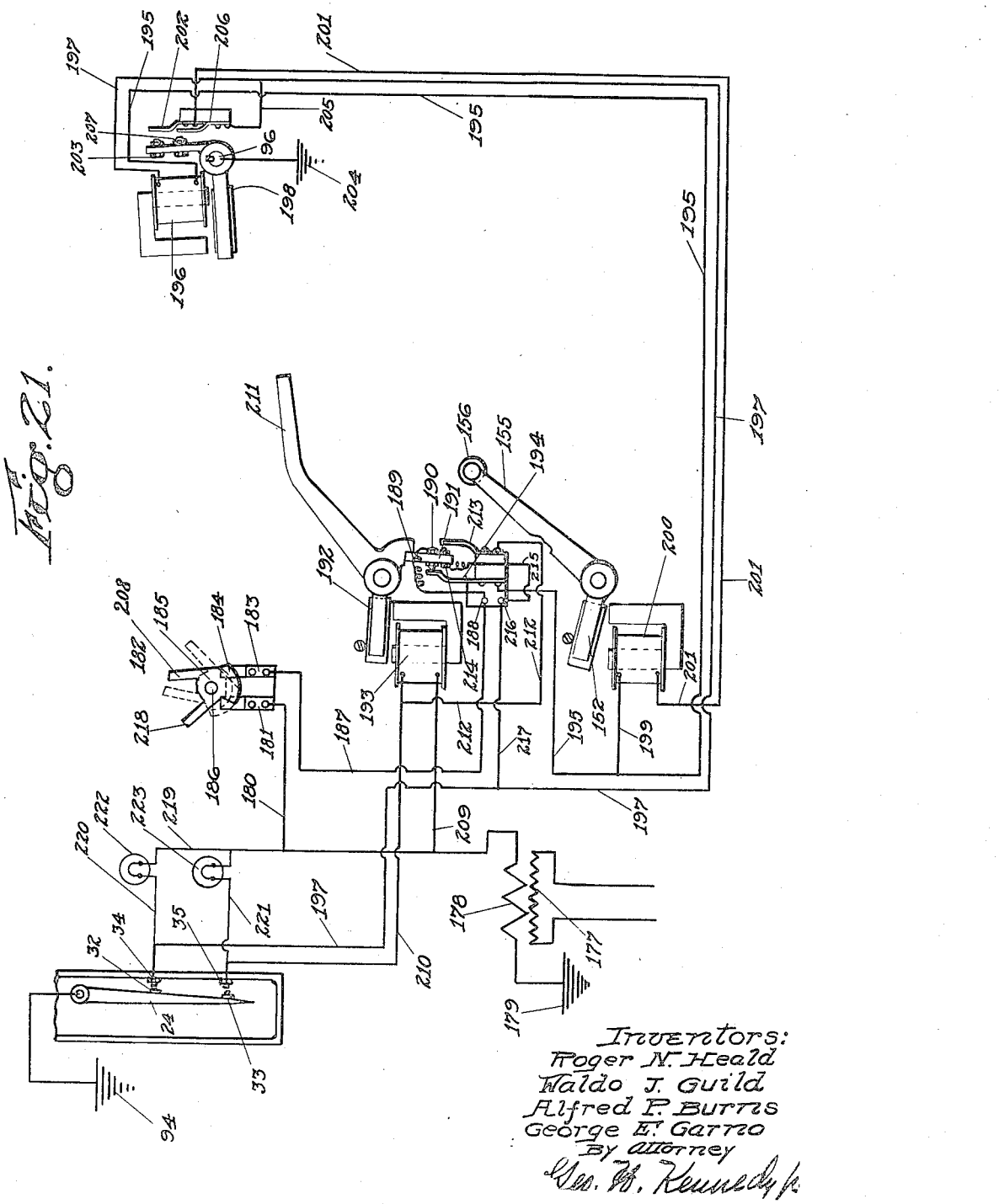

Patented Mar. 18, 1930

1,751,202

UNITED STATES PATENT OFFICE

ROGER N. HEALD, WALDO J. GUILD, ALFRED P. BURNS, AND GEORGE E. GARNO, OF WORCESTER, MASSACHUSETTS, ASSIGNORS TO THE HEALD MACHINE COMPANY, OF WORCESTER, MASSACHUSETTS, A CORPORATION OF MASSACHUSETTS

GRINDING MACHINE

Application filed January 24, 1925. Serial No. 4,466.

The present invention relates to grinding machines. In certain of its aspects, it is applicable to any of the various types of grinding machines, but its particular utility is in connection with internal grinding machines for grinding the internal cylindrical or conical surfaces of sleeves, gears, bushings, and like articles.

The general object of the invention is to provide a machine of this class that is capable of rapid and efficient production of such articles, ground and finished uniformly to within the closest limits of the desired and predetermined diameters. More specifically, the invention provides a machine which entirely eliminates the necessity for any interruption of the grinding by the operator, which interruptions have heretofore been frequent, for the operator to plug or gauge the work as it approaches finished size. In the machine of the present invention, a gauging or calipering device is maintained in operative relation to the surface being ground, and automatic means are made responsive to said device in order to secure, without attention by the operator, the various functions of the machine. Said automatic means, in the grinding of each piece of work, procures initially the dressing or truing of the grinding wheel, and subsequently, the cessation of the grinding operation on said piece of work, when the latter comes to the exact predetermined size. With any given setting of said automatic means, any number of similar work pieces, all ground accurately and uniformly to the same predetermined size, can be produced by the machine,—and this without regard to wear on the grinding wheel or variation in the amount of stock required to be removed from different pieces. According to the invention, the grinding wheel, at a predetermined point in relation to the finished size of each work-piece, is automatically dressed and trued, so that the final and finishing cuts which bring the work to the desired size are always taken with a fresh cutting-surface that is straight and true and which produces a smooth truly cylindrical hole.

Other and further objects of the invention will appear from the following detailed description, taken in connection with the accompanying drawings, in which—

Fig. 6 is a fragmentary plan view, on an enlarged scale, of the work gauging device and its associated parts.

Fig. 7 is a side view of the parts shown in Fig. 6.

Fig 9 is a sectional view on the line 9—9 of Fig. 6.

Fig. 10 is a sectional view on the line 10—10 of Fig. 6.

Fig. 11 is an enlarged fragmentary view of table dogs or stops and adjacent associated parts of the machine.

Figs. 12, 13 and 14 are enlarged views, partly in section and partly in end elevation, of the mechanism shown in Fig. 11, the sections being taken on the lines 12—12, 13—13 and 14—14, respectively, of Fig. 11.

Figure 1:
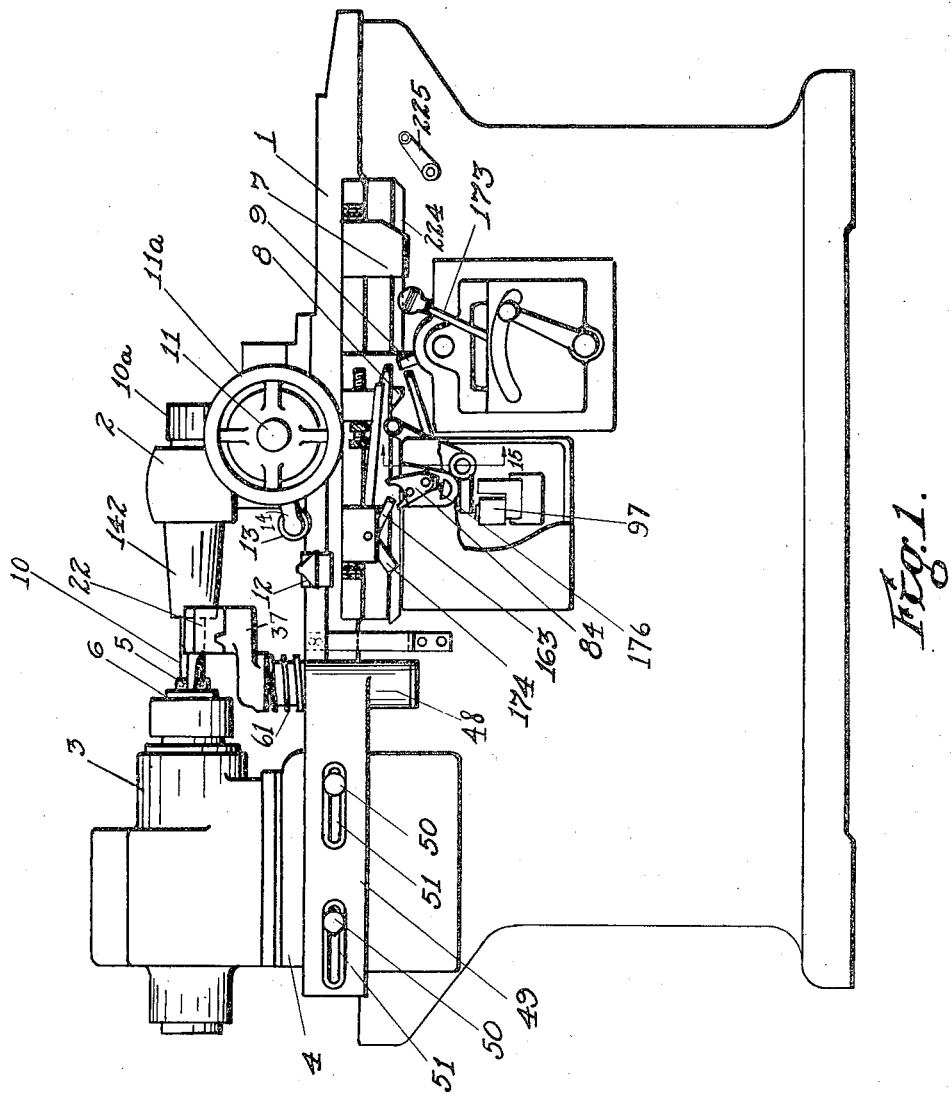
Fig. 1 is a front elevation of a grinding machine embodying the invention.
Figure 2:
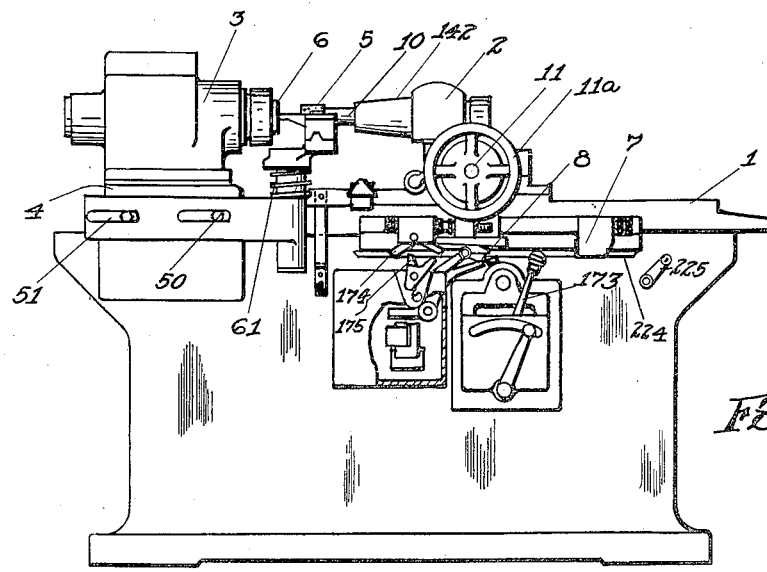
Figs. 2 and 3 are, respectively, a front elevation and a plan view, showing the wheel dressing operation.

Fig. 15 is an enlarged sectional view on the line 15—15 of Fig. 1.

Figure 16:
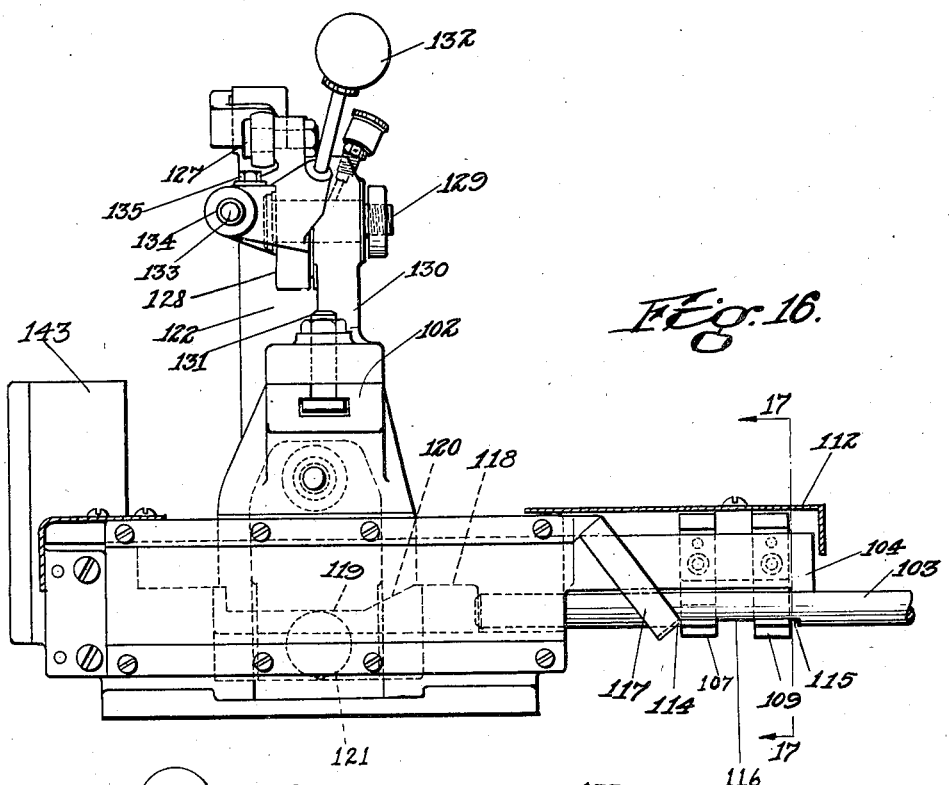

Fig. 16 is an enlarged elevational view from the front of the machine of mechanism associated with the operation of the diamond or dresser for the grinding wheel.

Figure 17:
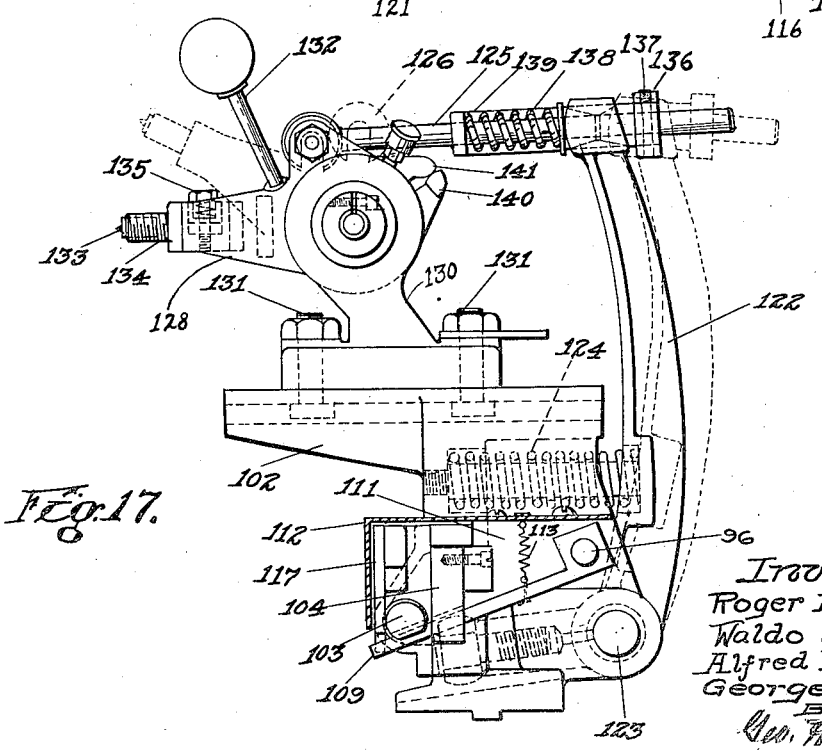

Fig. 17 is a view, partly in section and partly in elevation, of the mechanism shown in Fig. 16, the section being taken on the line 17—17 of Fig. 16.

Fig. 18 is an enlarged isometric view of certain of the mechanisms shown in Figs. 16 and 17.

Fig. 19 is an enlarged isometric view from the rear of the machine of certain of the mechanisms shown in Figs. 16 and 17.

Fig. 20 is a wiring diagram.

Fig. 21 is also a wiring diagram showing a slightly modified arrangement of parts from that shown in Fig. 20.

Like reference characters refer to like parts in the different figures.

Referring to the drawings, particularly Figs. 1 to 5 inclusive, the machine provides the usual reciprocatory table or carriage 1, which is ordinarily provided in any internal grinding machine. In such a machine, either the grinding wheel or the work to be ground may be carried on the table 1, the reciprocations of the latter being utilized in either case to produce a relative traversing movement between the grinding wheel and the work. As here shown, the table 1 supports and carries a wheel head 2 of the usual construction,—while the work which is to be operated upon is held in a work head 3, the latter being carried by a bridge 4 which spans the slideways provided by the machine frame for the back and forth movement of the table 1.

Said back and forth movement of the table 1, to cause the rotating grinding wheel 5 to make the required interior traverse of the rotating work piece 6, may be imparted in any well known manner, as for instance, by the use of the fluid pressure controlling and reversing mechanism which forms the subject matter of the copending application of Heald and Guild, Serial No. 629,882, filed April 4, 1923, now Patent No. 1,582,468 granted April 27, 1926. Such mechanism, or its equivalent, forms no part of the present invention and a detailed description thereof is therefore unnecessary; it is sufficient to note, for the purposes of the present application, that the driving means employed for the reciprocation of the table 1, be it hydraulic drive, or gear drive, or any other type, procures the reversal of said table at each end of the latter's normal working stroke by the use of spaced adjustable dogs 7 and 8, carried by the table and adapted to alternately engage and move an interposed member 9, whose position controls the direction of table travel.

Figure 3:
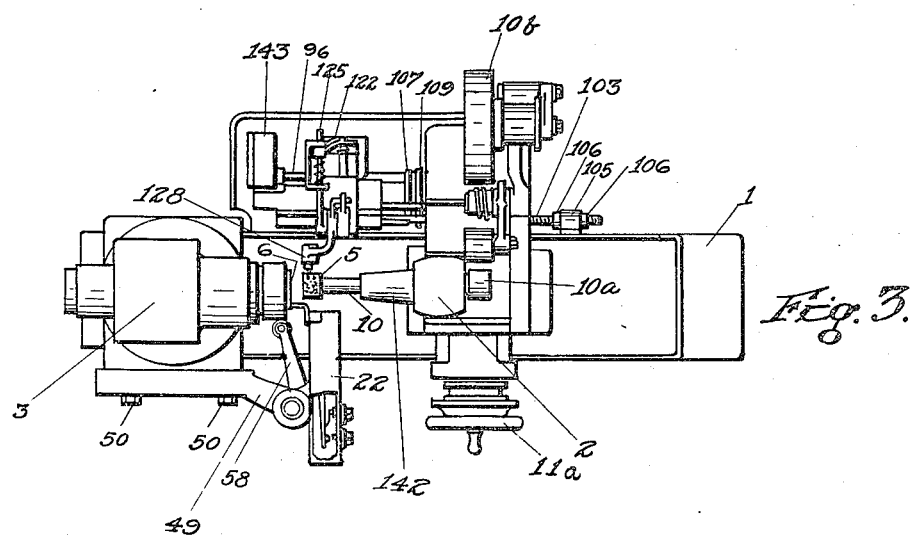
Figure 4:
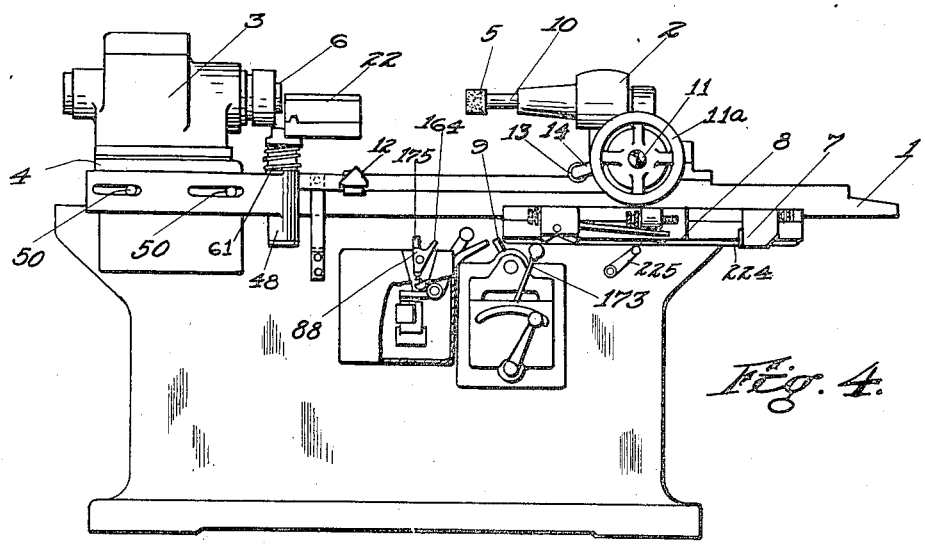
Figs. 4 and 5 are, respectively, a front elevation and a plan view, showing the positions automatically assumed by the parts at the finished of each grinding operation.
Figure 5:
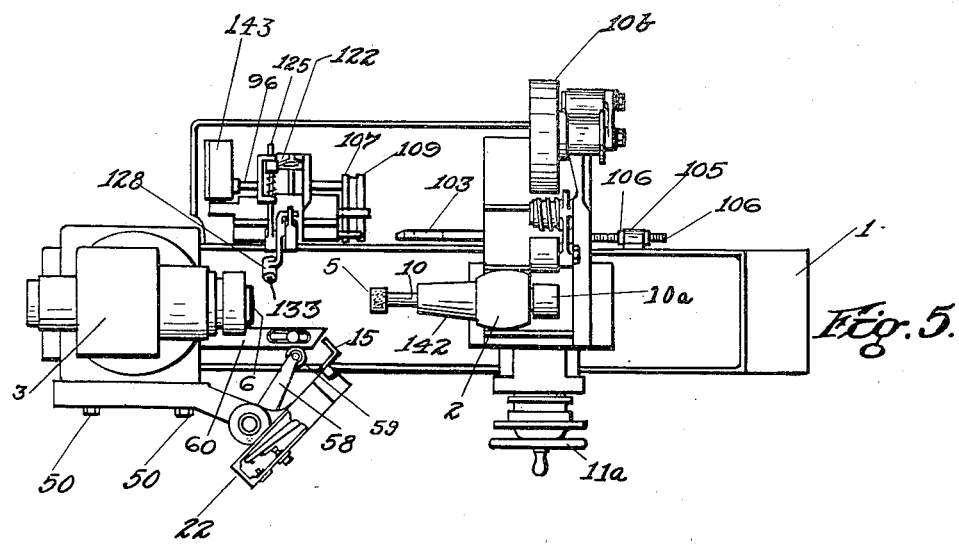

In the machine herein illustrated, the grinding wheel 5 is rotated at high speed in any suitable manner, for instance by a belt drive, Figs. 3 and 5, for the wheel spindle 10, the said wheel spindle having a pulley $10^a$ which is connected by a belt, not shown, to a larger pulley $10^b$ that is driven in any suitable manner. The work piece 6 is also rotated, but at a slower speed, this rotation being imparted in any suitable manner, as by a belt drive, not shown, from a countershaft. The machine also embodies the usual instrumentalities for both manual and automatic cross feed between work and wheel, here shown as embodied in a screw shaft 11 for feeding the wheel head 2 transversely of the table 1. Said screw shaft 11 may be operated, if desired, by the usual hand wheel $11^a$. The automatic operation of said screw shaft 11 is effected in the usual manner, at each reciprocation of the table 1, by a fixed dog or stop 12 which is engaged by a roller 13 on the end of a pivoted arm 14; the movements of said arm are transmitted through suitable pawl and ratchet mechanism, not shown, to the screw shaft 11, thereby to obtain the automatic cross feed of the grinding wheel 5 at each reciprocation of the table.

All of the above described mechanism is old and well known in the art, and of itself forms no part of the present invention. The latter involves the attainment in such or similar mechanism, of the novel and useful objects and results hereinbefore set forth, which, in the present instance, are initiated by and primarily under the control of the mechanism shown in Figs. 6 and 7 hereof. Said mechanism provides a member 15, having at one end a work calipering point 16 adapted, during the operation of grinding a work piece, to bear against the internal surface which is being ground, and to maintain its contact with said surface as the hole in the work piece is gradually enlarged by the grinding action of the wheel. The member 15 is to all intents and purposes a lever, said member, for the movement required of it to maintain the point 16 in constant contact with the interior of the gradually enlarging hole in the work piece, being supported by a pair of flexible U-shaped flat springs 17 and 18, which springs cross each other, as shown in Fig. 6, and are attached to two adjacent sides of a rectangular block portion 19 of member 15. At their other ends the crossed springs 17 and 18 are attached to two inner surfaces 20 and 21 of a box 22, these surfaces 20 and 21 being at right angles to each other, and the box 22 providing an opening 23 of sufficient size to permit the inward extension $15^a$, of member 15, to move freely about the pivotal axis which is afforded by the intersection of the planes of the U-shaped springs 17 and 18. This pivotal movement is accomplished by the flexing of these two springs, and takes place in the entire absence of lost motion since there is no bearing or pivot pin. Consequently, any movement of the extension $15^a$ of member 15 within the box 22, is invariably in exact accordance with the movement of calipering point 16 in maintaining contact with the surface of the gradually enlarging hole in the work piece.

Such motion of the member 15 is adapted to be transmitted to an indicator lever 24, pivoted at 25 within the box 22, with its free end adapted to move across the graduations of a suitable scale 26. Lost motion may be eliminated at bearing 25 by a spring $25^a$. The connection between extension $15^a$ and indicator lever 24 is made by a spring 27, which draws the parts together and maintains the lever 24 in contact with the end of a screw 28, said screw being adjustably threaded in extension $15^a$ and passing at its head end through a suitably enlarged slot or hole 29 in box 22, so as to permit adjustment from the exterior of said box. By turning the screw 28, the indicator lever 24 can be made to assume any desired position relative to the member 15, and said screw 28 is maintained in any given setting, and displacement thereof prevented by any suitable friction device, such as a spring 30. With the arrangement above described, a very slight movement of the calipering point 16 is multiplied many times in being transmitted to the indicator lever 24, as will be readily understood.

In the operation of the mechanism, the calipering point 16 maintains contact with the work, the movement of member 15 for this purpose being obtained by the pressure of a spring 31, and such movement, greatly multiplied, being transmitted through the above described connections to the indicator lever 24. The multiplied movement of the latter is made use of, at predetermined points, in the grinding of each work piece, to set in operation successively, first, the wheel dressing instrumentalities, and second, the instrumentalities for bringing about cessation of the grinding, when the work piece reaches a predetermined and desired size. To this end, the lever 24 carries two electrical contacts, namely a contact 32 for closing an electrical circuit that controls the wheel dressing operation, and a second contact 33 for subsequently closing an electrical circuit that controls the operations involved in cessation of grinding. In the paths of these two contacts 32 and 33, the box 22 provides suitable stationary terminal contacts 34 and 35, respectively. In the movement of lever 24, the points 32 and 34 come first into contact, and subsequently the points 33 and 35 come into contact; in order to permit this succession of contacts, the point 32 which engages first, is carried by the free end of a flat spring 36 attached to lever 24, so that, by the yielding of this spring, the subsequent movement of said lever, to bring the point 33 into contact with point 35, can take place. Before describing the electrical circuits which contain the contact points 32, 34 and 33, 35, respectively, (Figs. 20 and 21) the further construction and operation of the work calipering mechanism will be set forth.

Figure 8:
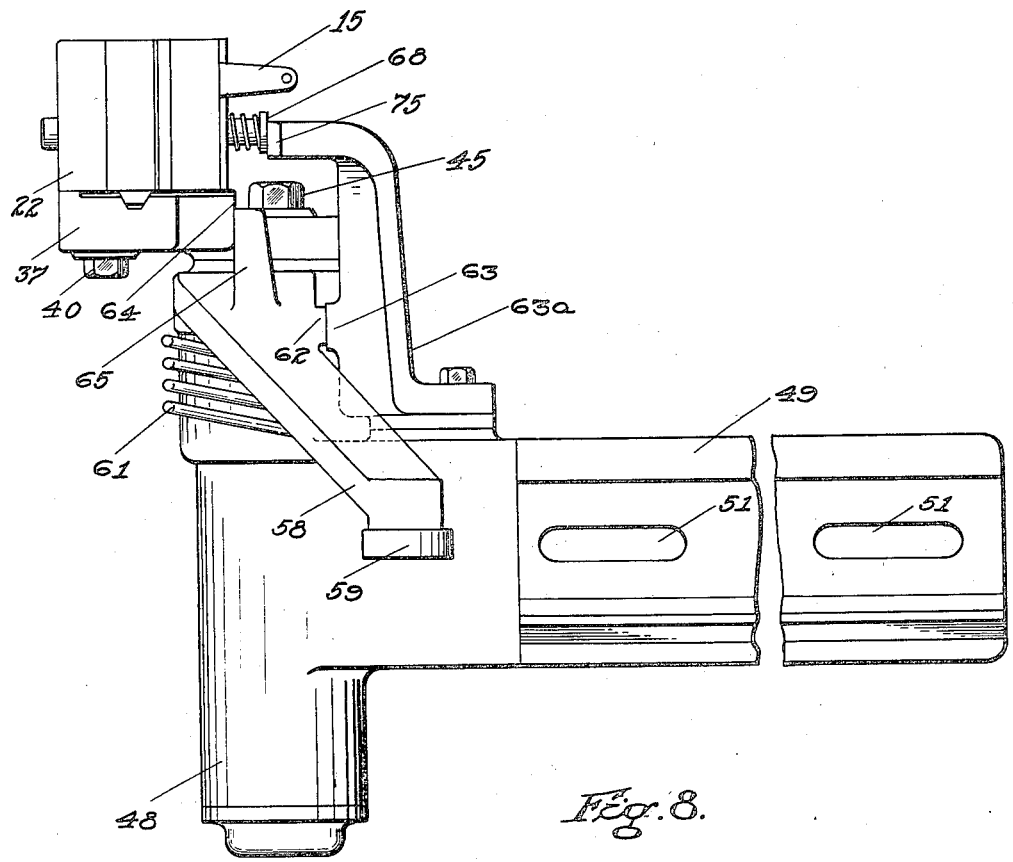
Fig. 8 is a detached rear view of the mechanism shown in Figs. 6 and 7.

The box 22 which carries the member 15 and indicator lever 24 as above described, is adjustable longitudinally on a supporting bracket 37, such adjustment being effected by a screw 38, turned by a hand wheel 38ª, said screw passing through a threaded lug 39 of bracket 37; after the box 22 has been adjusted as above described, it is firmly fastened in position by tightening the bolts 40, 40, which are threaded into the bottom of the box and pass through elongated slots 41, 41 of bracket 37, see Figs. 7, 9 and 10. Said bracket 37, which carries box 22, is rigidly attached to the upper end of a spindle 42, the construction being preferably as shown in Fig. 10, where the bracket 37 seats on a shoulder 43 of said spindle, or on an interposed washer 44, and is held firmly in position by a nut 45. Below the shoulder 43, the spindle 42 has a frusto-conical portion 46, the latter being received in a similarly shaped bearing recess 47 provided by an elongated spindle bearing sleeve 48, preferably formed integrally with a casting or bracket 49. The latter, as shown in Figs. 1 and 8, is secured to the machine base by bolts 50, which pass through slots 51 of said casting or bracket, to permit longitudinal adjustment of the same. At its lower end the sleeve 48 provides a ball bearing 52 for the lower end of spindle 42, the outer race of said ball bearing being pressed downwardly by a spring 53 and the inner race being attached to the spindle 42 by a nut 54. See Fig. 7. A cap 55 prevents the entrance of dirt and abrasive to the interior of said sleeve.

The above described construction provides an extremely effective mounting for the box 22, to permit it to swing into inoperative position, as shown in Fig. 5, so as to withdraw the calipering point 16 from the completed work piece, prior to the latter's removal from the machine. This swinging movement, on account of the extended bearing surfaces 46 and 47, takes place in the absence of play or lost motion and is effected in the following manner:—A split collar 56 surrounds that portion of the bracket 37 which is secured to the spindle 42, said collar being drawn into tight engagement with said bracket by a bolt 57. Extending from said collar is an arm 58 carrying a roller 59 which, in the normal work engaging position of the calipering point 16, lies in the path of, but spaced at some distance from, a cam bar 60 attached to the table 1. In this normal work engaging position, a strong coil spring 61, surrounding the sleeve 48 and attached thereto, exerts its force against arm 58 to rotate the latter counterclockwise. Said arm is firmly attached to the bracket 37 by collar 56 and bolt 57, and thus the force of spring 61, exerted on said arm, maintains the calipering and indicating mechanism as a unit in the position shown in Figs. 3, 6 and 8, where a lug 62 on arm 58 brings up against a fixed stop 63 formed on a bracket 63ª, which is attached to the casting 49. At the end of each grinding operation, when the table 1, as hereinafter described, is automatically given an extended movement to the right, as shown in Fig. 5, the cam bar 60, carried by said table, strikes roller 59 and rocks the arm 58 in a clockwise direction, against the force of spring 61, thereby swinging the entire calipering and indicating mechanism, as a unit, from the position shown in Fig. 3 into the inoperative position shown in Fig. 5, thus allowing the finished work piece to be with-drawn and a new work piece to be inserted in the chuck of the work head 3.

Should the operator, for any reason, desire to shift this mechanism manually into the inoperative position shown in Fig. 5, it is only necessary to loosen up on the bolt 57, thereby freeing the bracket 37 from the arm 58 and spring 61 and allowing said bracket with the attached box 22 to be swung freely out of the way. In restoring the parts to position for a resumption of the above described automatic operation, the operator swings the box and bracket until a surface 64 on the bracket engages with a lug 65 on arm 58; thereupon, the bolt 57 is again tightened to unite said arm and bracket.

In connection with the above described swinging movement of the calipering and indicating mechanism, the work calipering point 16 is automatically disposed in a position which prevents it from forcibly engaging the work piece in the act of entering the same, and which makes it incumbent upon the operator to release the member 15, carrying said point, at the commencement of each grinding operation by movement of a hand lever 66, as will now be described.

A rod 67 having a head 68 provides bearing portions 69 and 70 for sliding movement in bearing holes provided by opposite sides of the box 22. Between the bearing portions 69 and 70, the rod has a reduced neck 71, forming a shoulder 72 for cooperation with a downward projection 73, Fig. 7, of the extension 15$^a$. A spring 74 encircling the rod 67 and thrusting outwardly against the head 68 thereof, draws the shoulder 72 against projecting 73, and, in the inoperative position of the calipering and indicating mechanism shown in Fig. 5, this action of spring 74, being stronger than the action of spring 31, rocks the member 15 in a clockwise direction, thus to hold the calipering point 16 in an inoperative position. However, when the mechanism is swung from the position of Fig. 5 to the position of Fig. 3, the head 68 of rod 67, strikes a hardened steel stop plate 75 which is secured to the stationary stop member 63 and this action forces the rod 67 inwardly of the box 22 and relieves the member 15 of the influence of spring 74.

This action, of itself however, does not release the calipering point 16 for engagement with the surface of the work piece. An additional safeguard is provided by a shaft 76 which is pivotally mounted transversely of box 22 in suitable bearings provided by the opposite sides of said box, and which shaft has secured thereto the hand lever 66, hereinbefore referred to. The disposition of said hand lever is such that the weight thereof tends to turn the shaft 76 in a clockwise direction, viewed from the front of the box 22. A pin 77 extending from shaft 76 cooperates with an edgewise shoulder 78 of extension 15$^a$ in the following manner:—

When the rod 67, under the influence of spring 74, thrusts outwardly, and thereby rocks the member 15 in a clockwise direction, the pin 77 moves up in front of shoulder 78, due to the clockwise rotation of shaft 76 which is brought about by the overhang of hand lever 66. Thus said pin 77 serves to lock the member 15 in a position where the calipering point 16 will be inoperative. When subsequently the head of rod 67 engages the stop plate 75 as the calipering point moves into the work, and relieves the member 15 from the influence of spring 74, said member 15 still remains locked by pin 77 in inoperative position, and is not released from said position until the operator rocks the hand lever 66 upwardly; thereupon, under the influence of spring 31, the calipering point 16 will move into contact with the internal surface of the work piece and the operative connection between the extension 15$^a$ and the indicator lever 24 will be established. With the next swinging movement of the parts into the inoperative position shown in Fig. 5, the spring 74 moves the member 15 in a clockwise direction and the unbalanced weight of handle 66 automatically locks said member in said position. The shaft 76 is adjustable transversely of the box 22 in order to accommodate the position of the locking pin 77 to various settings of member 15 for different sizes of work; this is accomplished by an adjusting nut 79 on bearing sleeve 79$^a$ of said shaft, said nut 79 being held in any desired setting of check nut 79$^b$.

In the use of the mechanism as thus far described for the quantity production of identical work pieces all ground to the exact same internal size, a sample piece or pattern is first made and accurately gauged by hand, with the use of the ordinary sizing plugs or gauges. With this sample piece at the exact required size, and still rotating in the machine, after withdrawal of the grinding wheel from engagement therewith, the box 22 carrying the calipering and indicating mechanism is swung into operative position, and the point 16 caused to make contact with the finished ground surface of the sample. Then with this contact maintained, the position of the box is adjusted so that the end of the lever 24 registers with the zero marking on scale 26, and so that the point 33 on lever 24 will just make contact with the point 35, the latter being adjustable in and out, for this purpose. Under these conditions the point 32, which is carried by the spring 36, on lever 24, will also be in contact with the point 34; that is to say, the proportions of the parts are such that this last mentioned contact will have been made first, and will always be made first in the swinging of lever 24,—the spring 36 yielding sufficiently to allow the subsequent contact of points 33 and 35 to be made. These settings of the calipering and indicating mechanism and of the electrical contact points will be maintained throughout the subsequent run of the machine for the production of work pieces exactly like the sample or pattern,—and now will be described the mechanism by which, with each new workpiece introduced into the machine, the successive contacts of point 32 with point 34, and the point 33 with point 35, procure, first, the dressing of the grinding wheel just prior to its final or finishing cuts, and second, the complete withdrawal of said wheel and cessation of the grinding operation, after said final or finishing cuts have brought the workpiece to the exact desired size.

When the points 32 and 34 make contact, an electrical circuit is formed which, by the mechanism now to be described, causes the table 1 to have an amplified stroke to the right, in order to withdraw the grinding wheel 5 from the work, and, simultaneously, to cause a wheel dressing member or diamond to move into the amplified path of said grinding wheel, thereby to true the periphery of the latter as it passes by the point of said diamond. As shown in the wiring diagram of Fig. 20, electrical current may be supplied by a direct current generator 80, driven continuously, by any suitable means, not shown, from the same source of power that is used for the rotation of the grinding wheel or of the work head spindle. One terminal of this generator 80 is grounded as shown at 81, and the other is connected by a supply lead 82 to the central bar or plate 83 of a two-way switch,—the latter being designated as a whole by the numeral 84 and being disposed as shown in Fig. 1, on the front of the machine. Said switch 84 provides additional contact plates or bars 85 and 86, arranged on opposite sides of the central bar 83, and adapted to be alternately connected electrically to said central bar 83 by a connector 87 which is mounted on an oscillatory member 88. The latter is pivoted at 89, and in its full line position as shown in Fig. 20, disposes the connector 87 in contact with and across the two plates 83 and 85; in its other or dotted line position, the movable member 88 of switch 84 disposes the connector 87 in contact with and across the two plates 83 and 86.

The normal position of the movable switch member 88 is that shown in the full lines, and under these conditions, the supply lead 82 from the generator 80 is connected to two leads 90 and 91 taken off of the plate or bar 85 of the switch 84. One of these leads, 90, runs to the coil of an electromagnet 92, disposed on the rear side of the machine and shown in perspective in Fig. 19. The return lead 93 from the coil of electromagnet 92 is connected to the stationary contact point 34 of box 22. When the point 32, which is grounded as shown at 94, makes contact with the point 34, the electrical circuit containing the coil of electromagnet 92 is closed and said electromagnet is energized; this attracts and causes upward movement of an armature member 95 associated with said electromagnet, which member, splined to a spindle 96, to be hereinafter referred to, normally, in the absence of current flow through the coil of electromagnet 92, occupies, by gravity, the position shown in Fig 20.

The other lead, 91, from switch bar 85 passes to the coil of an electromagnet 97, disposed on the front of the machine, as shown in Fig. 1, and the return lead 98 from the coil of electromagnet 97 passes to an insulated spring contact 99, adjacent to the electromagnet 92. When the latter, as above described, is energized by the contact of points 32 and 34, the upward rocking movement of armature member 95 carries a contact point 100 into engagement with the insulated contact 99, and since said contact point 100 is grounded, as shown at 101, this grounds and completes the electrical circuit through the coil of electromagnet 97 and energizes said electromagnet. Thus the energization of the two electromagnets 92 and 97, the former for removing the dressing device and the latter for amplifying the stroke of the table, as hereinafter more fully described, is brought about by the movement of contact point 32, on indicator lever 24, into engagement with the contact point 34 of box 22,—and as will be apparent, the energization of magnet 97 is dependent upon the energization of magnet 92; in other words, the stroke of table 1 will not be amplified unless and until the mechanism for moving the dressing device into position is able to operate, which is signified by the rocking of spindle 96.

Said spindle 96 is suitably journalled in a box 143 which contains magnet 92, said box being secured to a dresser bracket 102 on the rear of the machine, and the partial rotation of said spindle 96, obtained, as above described, by the energization of electromagnet 92, is employed for the purpose of establishing a connection between two normally unconnected rods or bars, one of which, 103, is carried by the table 1, and the other of which, 104, is slidably mounted in the bracket or standard 102. The rod 103 moves with the reciprocatory table 1, being secured to said table by passage through a bracket 105 on the rear side of the table, and being held adjustably in place by means of nuts 106, 106, engaging with the threaded end portion of said rod. The slidable bar 104 is normally stationary, but when connected, as hereinafter described, to the reciprocating rod 103, its movement procures the shifting of a wheel dressing device in the path of the grinding wheel 5, as will now be shown.

Referring to Figs. 16, 17, 18 and 19, the spindle 96 has pinned thereto a finger 107, which in the normal inactive position of said spindle, passes through a slot 108 of bar 104 and has its free end lying just below the rod 103. Another finger 109 is loosely mounted on spindle 96, and it passes through a slot 110 of bar 104, with its free end disposed similarly to the free end of finger 107, but projecting slightly farther, as shown in Fig. 18. Between the two fingers 107 and 109 a block 111, secured to the bar 104, provides a journal bearing for the spindle 96, the latter in effect being supported and carried by said bar 104, and being moved longitudinally with said bar when the latter is itself moved,— this longitudinal movement of spindle 96 being permitted by the spline connection which it makes, as shown in Fig. 19, with the armature member 95. This longitudinal movement of spindle 96 has no effect on armature 95, the latter being held by any suitable means, not shown, in the box 143. The block 111 has secured thereto a casing 112, Figs. 16 and 17, which incloses the above described mechanism, and said block 111 also has secured thereto a spring 113, the latter acting on the loose finger 109 to draw it upwardly.

For cooperation with the two fingers 107 and 109, the rod 103 provides shoulders 114 and 115, respectively, these being formed by slabbing off said rod, as shown at 116, at an intermediate portion thereof, for a length slightly greater than the distance between the outside edges of said fingers. Under normal conditions, when the spindle 96 is in its inactive position, there is no engagement between the shoulder 114 and the outside edge of finger 107, and consequently the right hand movement of rod 103, in unison with table 1, has no effect on bar 104. Similarly, under normal conditions when the table 1 is reciprocating through its usual working path, the finger 109 is held in its downward position by a stationary cam member 117, so that it will not be engaged by either shoulder 114 or 115 in the movement of rod 103.

However, when the spindle 96 is rocked, as heretofore described, by the contact of point 32 with point 34, the finger 107 moves up into the path of shoulder 114, and thus the right hand movement of rod 103 is transmitted through said finger to bar 104 to carry it into the position shown in Fig. 16. This movement carries the finger 109 away from member 117, allowing the spring 113 to draw said finger into the recess 116. Shortly after this right hand movement of bar 104 is initiated, the current through magnet 92 is shut off as hereinafter described, but the pressure of shoulder 114 against finger 107 holds said finger up, and it only drops back by gravity to inactive position when this pressure is relieved on the reversal of the travel of table 1. On such reversal, the bar 104 moves to the left with rod 103, this movement being effected by the pressure of shoulder 115 against the outside edge of finger 109. When the bar 104 reaches its normal position of rest (to the left of that shown in Figs. 16 and 18), the finger 109 is forced out of recess 116 by engagement with the member 117, thus disconnecting bar 104 from the rod 103, which latter continues on to the left, as the table 1 resumes its normal working reciprocation, as hereinafter described. The member 117 does not engage the finger 107, but only the finger 109, this being due to the greater length of the last named finger. The above described movement of bar 104 obtains, successively, the movement of a dressing device into and then out of the path of the grinding wheel 5, in the following manner:—

Said bar 104, as shown in Figs. 16 and 18, provides on its under side two cam surfaces in different planes, namely a depressed surface 118 and a projecting surface 119, the two merging together by means of the inclined surface 120 and being operative on a roller 121 which is carried by the short arm of a bell crank lever 122, pivoted at 123 on the bracket or standard 102. The normal position occupied by the bar 104 is to the left of that shown in Figs. 16 and 18 and in this normal position, the depressed surface 118 is disposed directly above roller 121, the latter under these conditions rising into contact with said surface 118 under the influence of a strong spring 124, Fig. 17, carried by bracket 102 and thrusting outwardly against the long arm of bell crank lever 122 to move the latter to the right, as shown by the broken lines in Fig. 17. This dotted line position of lever 122 is the normal position which it occupies during the grinding operation and before the points 32 and 34 make contact to render the fingers 107 and 109 operative; when said fingers are rendered operative, the bar 104, moving to the right with rod 103, brings the cam portion 119 against the roller 121 and depresses the same, thereby causing the bell crank 122 to assume the full line position shown in Fig. 17. Thereafter on the return stroke of bar 104 as above described, the bell crank 122 resumes its normal dotted line position.

The upper end of the long arm of bell crank 122 is apertured for the passage of a link rod 125, whose other end has a slotted enlargement 126 which hooks over a stud 127 provided by a member 128. Said member 128 is mounted to swing on a trunnion 129, the latter being carried by a standard 130 which rises from the bracket 102 and which is adjustably attached to the latter by means of bolts 131, 131. A handle 132, secured to the swinging member 128, permits the operator to swing said member, after disconnecting link 125 from stud 127, to move a suitable wheel dressing point 133, preferably a diamond point, from the dotted to the full line position of Fig. 17, and vice versa,—the full line position being the operative position, where the diamond point is disposed in the path of the grinding wheel 5. Said diamond point 133 is preferably carried by a screw 134 which is adjustable in and out of the member 128, being held in any desired position of adjustment by a set screw 135.

The automatic movement of said diamond point through the above described operation of bell crank lever 122 and link rod 125 takes place in the following manner:—A collar 136 is adjustably secured by set screw 137 to the right hand end of link rod 125, this collar being engaged by the bell crank 122 in the latter's movement to the dotted line position of Fig. 17, thereby to swing the member 128 upwardly, so as to carry the diamond point 133 into its inoperative position. On the opposite or left hand movement of bell crank 122, which occurs as above described only when the points 32 and 34 make contact, the thrust of said bell crank 122 on link rod 125 is taken by a spring 138, which surrounds said link rod and which bears against the end of a yoke 139 extending forwardly from collar 136. This movement swings the dresser point 133 from the normal dotted line inoperative position to the full line operative position, which latter position is determined by the engagement of a lug 140 on swinging member 128 with a fixed stop 141 on standard 130. In no case can the dresser point be moved below or beyond the full line position shown, and any additional movement of bell crank 122 in this direction is absorbed by the spring 138.

As hereinafter described, simultaneously with this automatic disposal of the dresser point 133 in operative position by the right hand movement of bar 104, an amplified right hand movement of table 1 is initiated, which movement passes the wheel 5 across the dresser point 133 from left to right; then, upon reversal of the table, the wheel is passed again across the dresser point, this time from right to left, and during said left hand travel of the table, the bar 104, in moving to its normal position of rest, brings about the return of dresser point 133 to inoperative position, as shown by the broken lines in Fig. 17. Said dresser point 133 remains in such inoperative position, until the next succeeding workpiece inserted in the machine has been ground to a size which permits the points 32 and 34 to again make contact.

This maintenance of point 133 out of dressing position is especially significant, in view of the fact, as hereinafter described, that, at the conclusion of the grinding operation on each workpiece, the table 1 is again automatically run out to the right, to effect high speed withdrawal of the grinding wheel 5 from the working zone. On each such withdrawal movement, the grinding wheel 5 passes through the dressing position, but the dressing of said wheel on these occasions is avoided by retaining the dresser point 133 in inoperative position. Manifestly, from the standpoint of accuracy in the finished product, the very best time for dressing the grinding wheel and giving it a fresh cutting surface is just before said wheel takes the final and finishing cuts on the workpiece to bring it to the desired finished size. This interruption of the grinding operation, for the purpose of dressing the wheel, relieves the sidewise pressure of the wheel against the workpiece which has been built up in the grinding operation by successive advances of the cross-feed screw 11, and which pressure tends sometimes to spring the spindle 10 and to cause uneven wheel wear. When the grinding wheel, following its dressing, re-enters the workpiece, the cross-feed imparted to it for taking the final and finishing cuts to bring the work to size is not sufficient to build up any excessive or objectionable pressure, and hence these final and finishing cuts are taken under ideal grinding conditions.

The wheel dressing operation above described, aside from its automatic inauguration, is thus far superior to any dressing of the wheel in the intervals between successive workpieces; said last named dressing is of little value, because its effect is lost before the final and finishing cuts on the workpiece can be taken. In the present machine, where the grinding operation on each workpiece is interrupted, to provide for the dressing of the wheel just before the final and finishing cuts are taken, any further dressing, in the intervals between successive workpieces, would not only be useless, but would be harmful and wasteful. Harmful, because any contact between the dresser point 133 and the wheel 5, with the latter withdrawing from the work at high speed, would tend to cut a groove in the working surface of the wheel, and wasteful, because at such time, the wheel 5, in bringing the work to size, has been fed inwardly so far by the screw 11 that contact with the dresser point 133 would decrease its diameter excessively.

In addition to the above explained reasons for normally maintaining the dressing point 133 out of dressing position, is the further reason that said point, if left in said position, would be in the way of the bearing sleeve 142 (Figs. 1 to 5 inclusive) of the grinding wheel spindle 10, during the working reciprocations of table 1. Said spindle 10 obviously cannot have any excessive overhang beyond said bearing sleeve, because this would produce vibration that would destroy the accuracy of the grinding operation. Therefore, throughout the working strokes of table 1, the spindle bearing 142 must reciprocate in the dressing position of zone, and the descent of the dressing point into operative position is only permitted when the points 32 and 34 make contact, because, as a result of such contact, the right hand stroke of table 1 is automatically amplified, to carry the spindle bearing 142 away from the position or zone in question just as the dresser point 133 moves into it; this amplification of stroke, by the energization of electromagnet 97, takes place in the following manner:—

As shown in Fig. 11, the left hand table dog 8, which limits the right hand movement of table 1, is carried by a block 144 which, instead of being secured directly to the table 1, as is the case with the block 145 of dog 7, is mounted so as to be capable of sliding freely longitudinally of said table. Under normal conditions, when the table 1 is making its usual working reciprocations, to traverse the grinding wheel 5 back and forth within the workpiece, the block 144 of dog 8 is held in definite spaced relation to a block 146, which latter, the same as the block 145 of right hand dog 7, is a stationary block, adapted to maintain its predetermined setting or adjustment, longitudinally of the table 1, as given it by any suitable adjusting and holding devices, such for instance as the hand screw nuts 147, 147 applied to both blocks 145 and 146 and engaging with a screw rack 148 on table 1.

The device employed to hold the slidable block 144 in spaced relation to the fixed block 146 is here shown as a latch lever 149, pivoted at 150 on block 146 and having its free end disposed by gravity in abutting relation to a shoulder 151 on block 144, thereby holding the block 144 at a predetermined distance to the right of block 146.

When the electromagnet 97 is energized, simultaneously with and in consequence of the energization of electro-magnet 92, an armature member 152, Fig. 20, is caused to be moved; said member 152, pivoted at 153 on the front of the machine, normally rests by gravity with its upper surface in contact with a fixed pin 154, due to the weight of an arm 155 of said member. The counterclockwise rocking of member 152 under the influence of electromagnet 97, throws the arm 155 upwardly, carrying a roller 156 on the free end of said arm against the under side of latch member 149, to lift the latter sufficiently to free its end from the shoulder 151. See Figs. 11, 13 and 15.

This breaks the normal connection between the slidable block 144 and the fixed block 146; in consequence of which, on the right hand movement of table 1, the dog 8 will bear without effect against reversing member 9. Thus the right hand movement of table 1, on this particular stroke, will be extended beyond the usual reciprocatory working path, and the grinding wheel 5 will be carried out of the hole in the workpiece to a point just beyond the dresser point 133, which latter, as heretofore described, has just previously moved down into the amplified path of the grinding wheel, i. e., in the space vacated by the wheel spindle bearing 142. This amplified right hand travel of table 1 involves relative sliding movement between said table and the block 144, owing to the obstruction which the reversing member 9 imposes against the dog 8, to prevent said block 144 from moving with said table; finally, just after the grinding wheel 5 is carried past the dressing point 133, the block 144 brings up against the block 146, whereupon the solid backing thus afforded for the block 144 enables the dog 8 to shift the reversing member 9. This procures reversal of the table 1, and the left hand movement of said table thus inaugurated is caused to restore the parts automatically to normal position in the following manner:—

A member 157, secured rigidly to the frame of the machine, carries a flat spring 158, the free end of which is bent to provide inclined surfaces 159 and 160, for cooperation, respectively, with similarly inclined surfaces 161 and 162 at the lower corners of block 144. In the normal grinding operation of the machine when the blocks 144 and 146 are connected by latch 149, the surfaces 159 and 160, although in the path of block 144, offer no effective obstruction to the back and forth travel of said block in unison with the table 1, it being obvious that when either lower corner of the block, under these conditions, strikes either bevelled surface 159 or 160, such contact will wedge the spring 158 downwardly, said spring yielding sufficiently to allow the block 144 to pass over its upturned free end. However, when the block 144 has been freed from the block 146, as above described, to amplify a single right hand stroke of the table 1, the ensuing reversal of said table, with the block 144 still free, finds the surface 159 in position to contact with the corner 161 of said block, and under these conditions, the obstruction offered is sufficient to overcome whatever friction there may be tending to cause the block 144 to move to the left with the table. The block 144 being thus held stationary, while the table 1 and block 146 continue to move to the left, the latch member 149 finally resumes its normal position relative to block 144, the end of said latch member dropping behind the shoulder 151, and the parts being thus automatically restored to normal position at the conclusion of each amplified reciprocation of the table 1.

This amplified reciprocation carries the grinding wheel 5 outwardly past the dressing point 133 and then inwardly past it again; on the amplified outward or right hand stroke an outwardly and downwardly projecting bar 163, pivotally secured to the block 146 that moves in unison with the table, strikes an arm 164, Fig. 20, of movable switch member 88, thereby rocking said member from its normal full line position into the broken line position, where the connector 87 no longer makes contact with the right hand switch bar 85. This terminates the supply of current to the electromagnets 92 and 97, so that, notwithstanding the continued contact between the points 32 and 34, the respective armatures of said magnets are rendered free to move by gravity to their normal inoperative positions. Thus as before described, the finger 107 eventually drops below the slotted portion 116 of rod 103, and the roller 156 drops below the latch member 149, this automatically preventing any repetition of the wheel dressing operation, first, by insuring against a second descent of the dressing point 133, and second, by insuring against a second amplification of the right hand travel of the table. Therefore, with the parts restored to normal position at the end of this single amplified stroke of table 1, the normal working stroke of said table is automatically resumed, to permit the wheel 5 to take the final and finishing cuts on the work piece.

As heretofore described, when the work piece, by these final and finishing cuts of wheel 5, reaches the exact predetermined size, the second point 33 on indicator lever 24 makes contact with the fixed point 35 carried by box 22. At this time in the operation of the machine, the movable switch member 88 occupies the dotted line position shown in Fig. 19, having been moved to this position, as above described, by the amplified right hand travel of table 1. In this position, the connector bar 87 of member 88 makes contact with the central switch bar 83 and with the left hand switch bar 86, there being a lead 165 from the latter to the coil of a third electromagnet 166. Another wire or lead 167 connects the other end of said coil to the contact point 35, and thus when the point 33, which is grounded at 94, makes contact with the point 35, an electrical circuit is completed, which energizes the magnet 166.

Associated with magnet 166 is a movable armature member 168, which is pivoted at 169 on the front of the machine, and which normally rests by gravity with its upper surface in contact with a fixed pin 170, due to the weight of an arm 171 of said member. The counterclockwise rocking of member 168, under the influence of electromagnet 166 throws the arm 171 upwardly, interposing its free end in the path of table dog 8, which latter, as heretofore pointed out, normally, on the right hand working stroke of the table, strikes and moves the reversing member 9 to cause a reversal in the direction of table travel. As shown in Figs. 11 and 13, said dog 8 is pivotally mounted at 172 within a slot provided by carrying block 144, said slot permitting said dog, by gravity, to assume the position indicated in Fig. 11, wherein the free end of said dog 8, on the right hand travel of the table, will engage and move the reversing member 9. However, when the arm 171, as above described, moves upwardly into the path of dog 8, the free end of said dog, on the right hand movement of the table, engages with and rides upon the upwardly inclined surface of arm 171, this movement of dog 8 being permitted by its pivotal mounting and by the depth of the slot in the block 144. Such elevation of dob 8 carries it clear of reversing member 9, and thus when the points 33 and 35 come into contact, to energize the magnet 166, the table 1 is automatically prevented from reversing its travel at the right hand limit of its usual working stroke; instead, said table, through the disposal of dog 8 in a wholly inoperative position, continues its movement to the right, carrying the grinding wheel 5 out of the work and well past the dressing device, said table, finally, being brought to a full stop, at the outward limit of its right hand movement on the machine, by any suitable means, such for instance as those shown in the aforesaid copending application of Heald and Guild, Serial No. 629,882, filed April 4, 1923.

This automatic full withdrawal movement and ultimate stoppage of table 1, brought about by mechanism permitted to act upon the enlargement of the work piece to the exact predetermined size, gives ample room for the operator to remove the finished work piece from the machine and to insert a new unground work piece in the chuck or other work holding device of work head 3. This is not only because the grinding wheel 5 moves entirely away from the work, as shown in Fig. 5, but also because the extended right hand travel of table 1 brings the cam bar 60, carried by said table, into contact with the roller 59 of arm 58, thereby rocking said arm 58 to swing the entire calipering and indicating mechanism contained in box 22 away from the work, as indicated in Fig. 5; this automatically releases spring 74 and permits rod 67 to throw the calipering point 16 into inoperative position, thereby breaking the contact between points 33 and 35 and, in consequence, breaking the electrical circuit through magnet 166.

With a new unground work piece in position, and following any necessary approximate readjustment of the cross-feed by turning of hand wheel 11$^a$, the table 1 is caused, in any suitable manner, to resume its movement, as for instance by the rocking of a hand lever 173, Figs. 1 to 5 inclusive, which, as set forth and described in the aforesaid copending application of Heald and Guild, initiates the left hand travel of the table and carries the grinding wheel 5 into the hole of the work piece.

On this return movement of table 1, an inwardly and downwardly projecting bar 174, Fig. 11, which, like the bar 163, is pivotally secured to block 146, strikes the other arm 175, Fig. 20, of movable switch member 88, thereby rocking said member from the broken line position into the normal full line position. This restores the parts to a condition which insures the subsequent energization of electromagnets 92 and 97, when the grinding of the new work piece has progressed far enough to bring the points 32 and 34 into contact. In this return movement of the table 1 to carry the wheel 5 into the new piece of work, the bar 60 recedes from contact with the roller 59 and allows the spring 61 to swing the calipering and indicating mechanism automatically into operative position,— the operator, of course, then moving the hand lever 66 to free the work calipering point 16 for engagement with the inner surface of the work piece. Also on this return movement of table 1, the dog 8, being pivoted, can yield as it is drawn over the reversing member 9, and then said dog drops by gravity into its normal operative position to remain in said position as a limiting means for the normal working traverse of table 1 until the subsequent contact of points 32 and 34, as above described, automatically releases the carrying block 144 of said dog, to permit a single amplified wheel dressing stroke of table 1.

In connection with the foregoing, it is to be noted that the bar 163 and switch arm 164 occupy a plane which is different from the plane occupied by the bar 174 and the switch arm 175, thus preventing engagement of switch arm 164 by bar 174, or engagement of switch arm 175 by bar 163. Furthermore, it is to be noted that on the amplified wheel dressing stroke of table 1, when the movable switch member 88, Fig. 20, is moved into the dotted line position by bar 163, the right hand travel of the table 1 is not sufficient to carry the lower end of bar 174 past the arm 175 of said switch member; in consequence of this, the return of said switch member 88 to normal full line position, Fig. 20, only takes place when the table 1, after a full withdrawal movement, is caused to return for the commencement of a new grinding operation. The bars 163 and 174 are preferably pivoted on the same pivot pin 150 which is used for the latch lever 149, said bars occupying a slot in the block 146 which is of sufficient depth to allow them, by gravity, to hang in the positions shown in Fig. 11. This mounting of said bars 163 and 174 allows them to yield upwardly when engaged respectively by the switch arms 164 and 175, on the strokes of table 1 immediately following the above described strokes which procure the working engagement of said bars with said switch arms; in other words, the bar 163 only engages the switch arm 164 operatively on the right hand travel of the table, and the bar 174 only engages the switch arm 175 operatively on the left hand travel of the table. As shown in Fig. 1, the action of the two-way switch 84, as initiated in one direction or the other by engagement of the bars 163 and 174 with the arms of said member, is preferably made more positive by the employment of a spring pressed snap device 176, the latter operating, in the well known manner, to insure the throw of member 88 to extreme right or left hand position, as the case may be, after said member has been moved by the bar 163 or the bar 174, just past its vertical or central position.

Referring now to Fig. 21, there is shown, diagrammatically, a slightly modified arrangement of the electrical circuits and their associated mechanisms, by which the machine of our invention can readily be adapted to the use of alternating current, instead of direct current, as supplied by the individual generator 80 of Fig. 20. According to Fig. 21, alternating current from any suitable source is supplied to the primary winding 177 of a transformer, the secondary winding 178 of which is grounded on one side, as shown at 179. The other side of secondary winding 178 is connected by a lead 180 to a contact bar 181 of a one-way switch,—the latter being designated as a whole by the numeral 182 and, in the modified arrangement, replacing the two-way switch 84 on the front of the machine. Said switch 182 provides another contact plate 183 which is adapted to be alternately connected with and disconnected from the supply bar 181 by a connecting segment 184, the latter being mounted on an oscillatory member 185. Said member 185 is pivoted at 186 and in its full line position, shown in Fig. 21, disposes the segment 184 in contact with and across the two plates 181 and 183; in its other or dotted line position, the movable member 185 disposes the segment 184 in inoperative position, so that no current will flow from bar 181 to plate 183.

A lead 187 from plate 183 runs to a stationary binding post 188, and from this post 188, a flexible lead 189 runs to a contact 190 on the tailpiece 191 of a pivoted armature member 192, the latter corresponding functionally to the armature member 168 of Fig. 20, and being under the influence of an electromagnet 193, to be hereinafter referred to. In the normal position which the armature member 192 assumes by gravity, uninfluenced by the electromagnet 193, the contact 190 of tailpiece 191 bears against a spring contact 194, and from the latter a lead 195 runs to the coil of an electromagnet 196 on the rear of the machine, corresponding functionally to the electromagnet 92 of Fig. 20. The return lead 197 from the coil of electromagnet 196 runs to the stationary contact point 34 of box 22.

Thus with the switch member 185 in its operative full line position, when the point 32, which is grounded, as shown at 94, makes contact with the point 34, the electrical circuit containing the coil of magnet 196 is closed, and said magnet is energized; this attracts and causes upward movement of the armature member 198 which is associated with said magnet, and which, corresponding to the armature member 95 of Fig. 20, is splined to the spindle 96 that controls the movement of dressing point 133 into operative position.

A branch 199 from lead 195 runs to the coil of another electromagnet 200, disposed on the front of the machine and corresponding functionally to the electromagnet 97 of Fig. 20. The return lead 201 of electromagnet 200 runs to an insulated spring contact 202 adjacent to the electromagnet 196. When the latter, as above described, is energized by contact of points 32 and 34, the upward rocking movement of armature member 198 carries a contact point 203 into engagement with the insulated spring contact 202, and since the contact point 203 is grounded, as shown at 204, this grounds and completes the electrical circuit through the coil of electromagnet 200 and thus energizes said electromagnet. The latter, like the electromagnet 97, Fig. 20, controls the armature member 152, whose arm 155 carries the roller 156 which operates the latch member 149, Fig. 11, to amplify the right hand travel of table 1, as heretofore described, in order to bring the grinding wheel 5 into engagement with the dresser point 133,—the latter, on this amplified stroke of the table, being moved into operative position when the simultaneously energized electromagnet 196 rocks the spindle 96.

When alternating current is used, as illustrated in Fig. 21, the electromagnets 193, 196 and 200, notwithstanding the employment of laminated cores therein, do not always exert sufficient holding power on their respective armature members 192, 198 and 152 to insure the positive performance of the several functions which are initiated by the rocking of said armature members. Hence, in respect of electromagnet 196, whose energization, as above described, controls the energization of electromagnet 200, there is provided a holding circuit to insure the retention of armature member 198 in its raised position, once it has been drawn upwardly by electromagnet 196,—and this notwithstanding any subsequent decrease in the strength of said electromagnet, or fluttering contact between the points 32 and 34. Said holding circuit is constituted by a branch 205 from lead 197 which runs to a second insulated spring contact 206, the latter adapted to be engaged by a point 207, grounded at 204, when the armature member 198 rocks upwardly. This grounds the electromagnet 196 independently of the ground that is made through the points 32 and 34, and thus said electromagnet and also the electromagnet 200 stay grounded and energized until, on the amplified right hand dressing stroke of table 1, the arm 208 of switch member 185 is struck by the bar 163, Fig. 11, and moved into its broken line position, thereby discontinuing the flow of current through switch 182.

In this arrangement of parts using alternating current, the third electromagnet 193, whose energization initiates the full withdrawal movement of table 1, is entirely removed from the control of switch 182. As shown in Fig. 21, a branch 209 from supply lead 180 runs to the coil of electromagnet 193, and a return lead 210 from said coil runs direct to the contact 35 of box 22, so that when point 33, which is grounded at 94, makes contact with point 35, this grounds and completes the electrical circuit through the coil of electromagnet 193 and energizes said electromagnet. The consequent rocking of armature member 192, which interposes its arm 211 in the path of table dog 8, to effect, as above described, the complete right hand withdrawal movement of table 1, establishes a holding circuit for electromagnet 193 in the following manner:—

A branch 212, from return lead 210, runs to an insulated spring contact 213, and a second contact 214, carried by the tailpiece 191 of armature member 192, is adapted to engage with contact 213 when said armature member is drawn downwardly by the energization of electromagnet 193. Said contact 214 has a flexible connection 215 to a binding post 216, the latter being connected by a lead 217 to the return lead 197 which runs to the already grounded contact point 34. Thus, once the electromagnet 193 is energized, the rocking of its armature member 192 establishes an independent grounded circuit through its coil, to retain the armature member in depressed position until, on the full withdrawal movement of table 1, the box 22 is swung outwardly, as shown in Fig. 5, thus to free the lever 24 and break the grounded connections of points 34 and 35.

It is to be noted that with the establishment of the holding circuit above described for electromagnet 193, the contact point 190 on tailpiece 191 moves away from spring contact 194, and thus prevents any current from flowing to the coils of electromagnets 196 and 200. Ordinarily, in the operation of grinding a workpiece, there would be no necessity for this particular safeguard against untimely operation of the wheel dressing instrumentalities, because, under usual conditions, the switch 182, at this point in the cycle of operations, has already been thrown into the dotted line position, to discontinue altogether the flow of current to said electromagnets 196 and 200. But it sometimes happens that a workpiece already ground to size, or one that is over-size or eccentrically-apertured, is placed by mistake in the chuck of work head 3,—in either of which cases, the disposition of the calipering point 16 is such that the points 32 and 34, and 33 and 35, respectively, make simultaneous contact. Under these conditions, immediate full withdrawal of the grinding wheel 5 from the workpiece is desirable, in order to permit insertion of a workpiece that is susceptible of being ground and finished in the usual manner. Also, under these conditions, the switch 182 is in its full line operative position, having been moved to this position by engagement of bar 174 with its left hand arm 218 on the immediately preceding return of table 1 to working position. Hence, in order to prevent the functioning of the wheel dressing instrumentalities on the full withdrawal movement of table 1 which is initiated under the above described conditions, the energization of electromagnet 193 is made to cause separation of the contacts 190 and 194, thereby preventing energization of electromagnets 196 and 200.

In connection with the direct current arrangement shown in Fig. 20, it is to be noted that, although the points 32 and 34, and 33 and 35, come simultaneously into contact when a full-size, over-size, or eccentrically-apertured workpiece is disposed in the machine, the normal sequence of operations is nevertheless maintained. That is to say, the use of the two-way switch 84 prevents the full withdrawal stroke of table 1 from taking place until after a single amplified dressing stroke has occurred, and thus no injury to the dresser point 133 or to the wheel 5 can transpire from the fact that the electrical contact which initiates the full withdrawal movement is made simultaneously with the electrical contact which initiates the action of the dressing instrumentalities.

It is obvious, of course, that the circuit breaking mechanism above described in connection with Fig. 21 can be used, if desired, with the direct current arrangement shown in Fig. 20, as can also the holding circuits of Fig. 21. Likewise, when the machine is using alternating current, the arrangement shown in Fig. 21 can readily be modified to employ, instead of the single pole switch 182, the two pole switch 84 of Fig. 20, and conversely, when using direct current, the arrangement shown in Fig. 20 can readily be modified to employ the single pole switch 182 of Fig. 21. With either form of current supply, the machine, when equipped with the work calipering and indicating mechanism shown particularly in Figs. 6 and 7, can be used very advantageously, even in the absence of certain of its automatic devices, in the following manner:—

As shown in Fig. 21, the current supply lead 180 has a branch 219, from which parallel connections 220 and 221, respectively, run to the contact points 34 and 35 of box 22, and each of these connections 220 and 221 has in circuit therewith a suitable signalling device, such as the lamps 222 and 223, respectively. When the points 32 and 34 make contact, the lamp 222 is lighted, which is a signal for the operator to initiate the wheel dressing operation. This he may do in the absence of the automatic devices, which are under the control of electromagnets 92 and 97 of Fig. 20, or electromagnets 196 and 200 of Fig. 21, by pulling forward the handle 132 of the dressing device, to dispose the dressing point 133 in the path of the wheel, and by simultaneously seizing and raising the latch lever 149, so as to obtain a single amplified stroke of the table 1,—as described for instance in the copending application of Heald and Hubbell, Serial No. 703,097, filed March 31, 1924.

After the wheel 5 has been dressed, it resumes the grinding operation, and subsequently the points 33 and 35 make contact to light the lamp 223. This is a signal for the operator to initiate the full withdrawal movement of table 1, and in the absence of the automatic instrumentalities controlled by the electromagnet 166 of Fig. 20, or the electromagnet 193 of Fig. 21, this may be done by raising the pivoted left hand table dog 8, either manually or by a foot treadle,—as described, for instance, in the copending application of Drake and Guild, Serial No. 685,577, filed January 11, 1924.

The carrying block 144 of dog 8 has secured thereto an elongated cam bar 224, Figs. 1, 2, 4 and 11, the right hand end of which is spaced from the striking end of dog 8 by a distance slightly less than that between member 9 and the end of lever arm 225, in the path of cam bar 224. In the normal working reciprocations of the table 1, when the grinding wheel is in contact with the work, the lever arm 225 is not reached by the cam bar 224, since the dog 8 will always strike the member 9 to reverse the table at a time when the cam bar and the lever arm are still a little distance apart. However, when the dog 8 is raised, either automatically or by the operator, to pass over the member 9 and thereby to inaugurate the full withdrawal movement of the grinding wheel from the work, the cam bar 224 will engage and depress the lever arm 225. This depression of the arm 225 is availed of to produce an increased speed of travel of the table 1, either in the manner described in the aforesaid copending application of Heald and Guild, Serial No. 629,882, or in any other well known manner. This automatically accomplishes the right hand withdrawal movement of the grinding wheel at maximum speed, irrespective of the speed selected for the working traverse of said wheel, and eliminates any unnecessary loss of time in moving the grinding wheel away from or toward the work, since the cam bar 224 maintains its engagement with the lever arm 225 throughout the entire withdrawal movement and throughout the entire return movement, until just before said wheel resumes its normal working reciprocations. This increased speed of the table 1 is not obtained on the single amplified stroke of said table that is employed in the dressing of the grinding wheel. This is because the cam bar 224, being secured to the block 144, shifts to the left with said block, relatively to the table 1, and does not reach the lever arm 225, notwithstanding the increased right hand travel of said table.

We claim:

1. In a grinding machine, a grinding wheel having a reciprocatory working traverse relative to the work, a grinding wheel dresser, a work calipering device, means set in operation by said work calipering device for disposing said dresser in the line of movement of said wheel, and means, dependent upon the operation of said last named means, for increasing the traverse of said wheel, to include the dresser in its path.

2. In a grinding machine, a grinding wheel having a reciprocatory working traverse relative to the work, a grinding wheel dresser, a work calipering device, means set in operation by said work calipering device for disposing said dresser in the line of movement of said wheel, means, dependent upon the operation of said last named means, for increasing the traverse of said wheel, to include the dresser in its path, and means for automatically procuring the resumption of the normal working traverse between said wheel and the work.

3. In a grinding machine, a grinding wheel, a support for said wheel having reciprocatory movement, to effect traverse of the work by said wheel, a grinding wheel dresser, means to move said dresser into an operative position beyond said traverse and between the transverse planes of the limits of travel of said support, and means, responsive to the actuation of said means to move said dresser, for amplifying the stroke of said support, thereby to move said grinding wheel past said dresser.

4. In a grinding machine, a wheel dressing mechanism, an electromagnet to set said mechanism in operation, work calipering means adapted to close the circuit of and to energize said electromagnet, a holding circuit for said electromagnet, and means responsive to the energization of said electromagnet by said work calipering means for closing said holding circuit, thereby to maintain said electromagnet energized, notwithstanding breakage of the first named circuit by movement of said calipering means.

5. In a grinding machine, a wheel withdrawal mechanism, an electromagnet to set said mechanism in operation, work calipering means adapted to close the circuit of and to energize said electromagnet, a holding circuit for said electromagnet, and means responsive to the energization of said electromagnet by said work calipering means for closing said holding circuit, thereby to maintain said electromagnet energized, notwithstanding breakage of the first named circuit by movement of said calipering means.

6. In a grinding machine, a grinding wheel, a wheel dressing device, an electromagnet adapted, when energized, to effect movement of said device into dressing position, a second electromagnet adapted, when energized, to effect movement of said grinding wheel through said dressing position, and means, responsive to the energization of one of said electromagnets, for completing an electrical circuit through the other of said electromagnets.

7. In a grinding machine, a grinding wheel, a wheel dressing device, an electromagnet adapted, when energized, to effect movement of said device into dressing position, a second electromagnet adapted, when energized, to effect movement of said grinding wheel through said dressing position, and means, responsive to the energization of the first electromagnet, for completing an electrical circuit through said electromagnet.

8. In an internal grinding machine, a grinding wheel, a table or carriage movement of which produces a grinding traverse between said grinding wheel and a workpiece, a work calipering device having means whereby the feeler point thereof is biased to maintain continuous contact, during the grinding operation, with the surface of the hole in the workpiece that is ground by said wheel, a pivotal mounting for said calipering device, and means operated by movement of said carriage for swinging said calipering device out of said hole by an arcuate movement when the hole, by grinding, has reached the desired finished diameter.

9. In an internal grinding machine, a grinding wheel, a table or carriage movement of which produces a grinding traverse between said grinding wheel and a workpiece, a work calipering device having means whereby the feeler point thereof is biased to maintain contact, during the grinding operation, with the surface of the hole in the workpiece that is ground by said wheel, a support for said calipering device, said support being mounted on a pivot, means set in operation by said calipering device for automatically causing an extended movement of said table or carriage and thus withdrawal of said wheel from said hole when the latter, by grinding, has reached the finished diameter, means responsive to said withdrawal of the wheel, for swinging said support about its pivot thereby removing said calipering device from said hole and permitting the removal of the finished workpiece from the machine and the disposel of an unground workpiece therein, means responsive to the return movement of said carriage involving movement of said wheel towards said second mentioned workpiece for disposing said calipering device in the hole thereof to be ground, and a device to cause avoidance of contact between said calipering device and said second workpiece.

Dated this 21st day of January, 1925.

ROGER N. HEALD.
WALDO J. GUILD.
ALFRED P. BURNS.
GEORGE E. GARNO.